United States Patent [19]

Sears et al.

[11] Patent Number: 4,673,849
[45] Date of Patent: Jun. 16, 1987

[54] PERMANENT MAGNET MOTOR CLOSED LOOP RESTARTING SYSTEM

[75] Inventors: Jerome Sears, Wyckoff; Walter Parfomak, Wallington; Walter Kluss, Clifton, all of N.J.

[73] Assignee: Allied Corporation, Morris Township, Morris County, N.J.

[21] Appl. No.: 917,586

[22] Filed: Oct. 10, 1986

[51] Int. Cl.⁴ .............................................. H02P 1/18
[52] U.S. Cl. .................................. 318/272; 318/136; 318/138; 318/254; 318/431
[58] Field of Search ............... 318/136, 138, 254, 272, 318/331, 430, 431, 434, 439, 721, 722, 724, 746, 747, 749, 751, 753, 778, 781, 785, 786

[56] References Cited

U.S. PATENT DOCUMENTS

| | | | |
|---|---|---|---|
| 4,097,788 | 6/1978 | Nygaard et al. | 318/138 X |
| 4,275,343 | 6/1981 | Fulton et al. | 318/721 |
| 4,455,513 | 6/1984 | Fulton et al. | 318/254 X |
| 4,492,902 | 1/1985 | Ficken et al. | 318/254 |

FOREIGN PATENT DOCUMENTS 2949947 6/1981 Fed. Rep. of Germany ...... 318/254
52-5418 1/1977 Japan ................................... 318/254
2167253 5/1986 United Kingdom ................ 318/254

Primary Examiner—William M. Shoop, Jr.
Assistant Examiner—Bentsu Ro
Attorney, Agent, or Firm—Howard G. Massung; Stanley N. Protigal

[57] ABSTRACT

A closed loop drive system for a permanent magnet motor (12) operable in a two-phase drive mode during a start cycle and a single phase drive mode thereafter during which the start cycle is reinitiated if the back EMF generated in a sensing winding (18) falls below a reference value. The permanent magnet motor (12) is driven as a two-phase motor with an increasing frequency input during the starting cycle and after initial starting is driven as a single phase motor as long as the back EMF induced in a stator sensing winding (18) remains above a predetermined value. A restart decision circuit (20) is provided which samples the back EMF induced into the stator winding (18) not being driven during single phase operation and initiates a restart cycle if the induced back EMF during single phase operation falls below a selected reference.

9 Claims, 3 Drawing Figures

PERMANENT MAGNET MOTOR CLOSED LOOP RESTARTING SYSTEM

BACKGROUND OF THE INVENTION

1. Field of the Invention

The present invention relates to starting and driving permanent magnet motors.

2. Description of the Prior Art

Permanent magnet motors are utilized in inertial gyroscopic sensing instruments where optimum efficiency and rate stability are required.

In prior applications, gyroscope wheels were supported by a ball bearing suspension where bearing torque differential between start and run mode is relatively minor. Current applications requiring high performance and low noise operation utilize gyroscopes where the rotating inertia is suspended on a hydrodynamic bearing. In a hydrodynamic bearing, the rotating member is constructed to generate the pressurized gas utilized by the bearing. These type of bearings are characterized by a relatively high dry friction start up torque and virtually zero friction running torque. Thus, the torque dynamics required to provide reliable start/run operation become very critical.

In conventional permanent magnet wheel drive designs, the permanent magnet drive motor includes a two-phase stator, a permanent magnet rotor and a suitable electronic drive stage to start, run-up and maintain a synchronous speed operation. Starting is implemented using a two-phase drive mode during which drive current is fed to both stator windings. At a suitable rotational rate, typically 5% to 10% of synchronous speed, the drive mode is switched to single phase mode wherein drive current is fed to only one stator winding. The other stator winding functions as a sensing winding and provides a voltage which is indicative of rotor position and speed. The driven phase winding is driven by a signal which is a function of both the speed signal from the sensing winding as well as the input speed command reference. The speed signal is commutated by the position signal from the sensing winding. Upon achieving synchronous speed, steady state acceleration torque becomes zero and the amplitude of the drive current is reduced by an appropriate feedback signal to the minimum required for the motor to overcome friction and windage torques. Prior art U.S. Pat. Nos. 4,275,343 and 4,492,902 show exemplary permanent magnet motor starting circuits.

In order to commence motor rotation from rest and drive it up to a predetermined rotational velocity, typically a small fraction of synchronous speed, a starting circuit is provided that slowly increases the excitation frequency until an appropriate speed is reached at which back EMF feedback control can effectively operate. From this point on the drive electronics switches into a single phase mode drive operation. The back EMF is now used to provide the following: (a) speed information to be compared to reference speed command signal; and (b) timing information for single phase drive commutation.

In conventional permanent magnet motor applications, starting is implemented in an open loop manner, without feedback. If feedback is not provided, wheel starting characteristics are indeterminate and a no start condition can occur under adverse environmental conditions. The present invention avoids such problems by generating a rotating magnetic field which works in conjunction with sense and decision circuits to determine whether a run mode is to be maintained or a restart mode is to be initiated.

SUMMARY OF THE INVENTION

A method and apparatus for starting a permanent magnet motor having a permanent magnet rotor and stator with windings in which the stator is energized for polyphase driving during a starting cycle after which a single phase drive mode is initiated during which the back EMF generated in an unenergized stator winding is sampled and analyzed to determine if a restart cycle should be initiated. During the starting cycle, a rotating magnetic field drives the motor stator windings with signals having an increasing frequency. At a predetermined speed the drive is disconnected from one of the stator windings for a short time during which a sensing circuit tests the magnitude of the back EMF signal. A restart decision circuit then determines whether to maintain the single phase drive operation or to reinitiate the starting cycle. The restart decision making circuit remains active during steady state single phase run operation, allowing wheel speed to be continuously monitored. In case of an unexpected wheel run down during operation, the restart cycle is initiated.

BRIEF DESCRIPTION OF THE DRAWINGS

For a better understanding of the invention, reference may be had to the preferred embodiment exemplary of the invention shown in the accompanying drawings in which.

DETAILED DESCRIPTION OF THE PREFERRED EMBODIMENT

Figure 1:
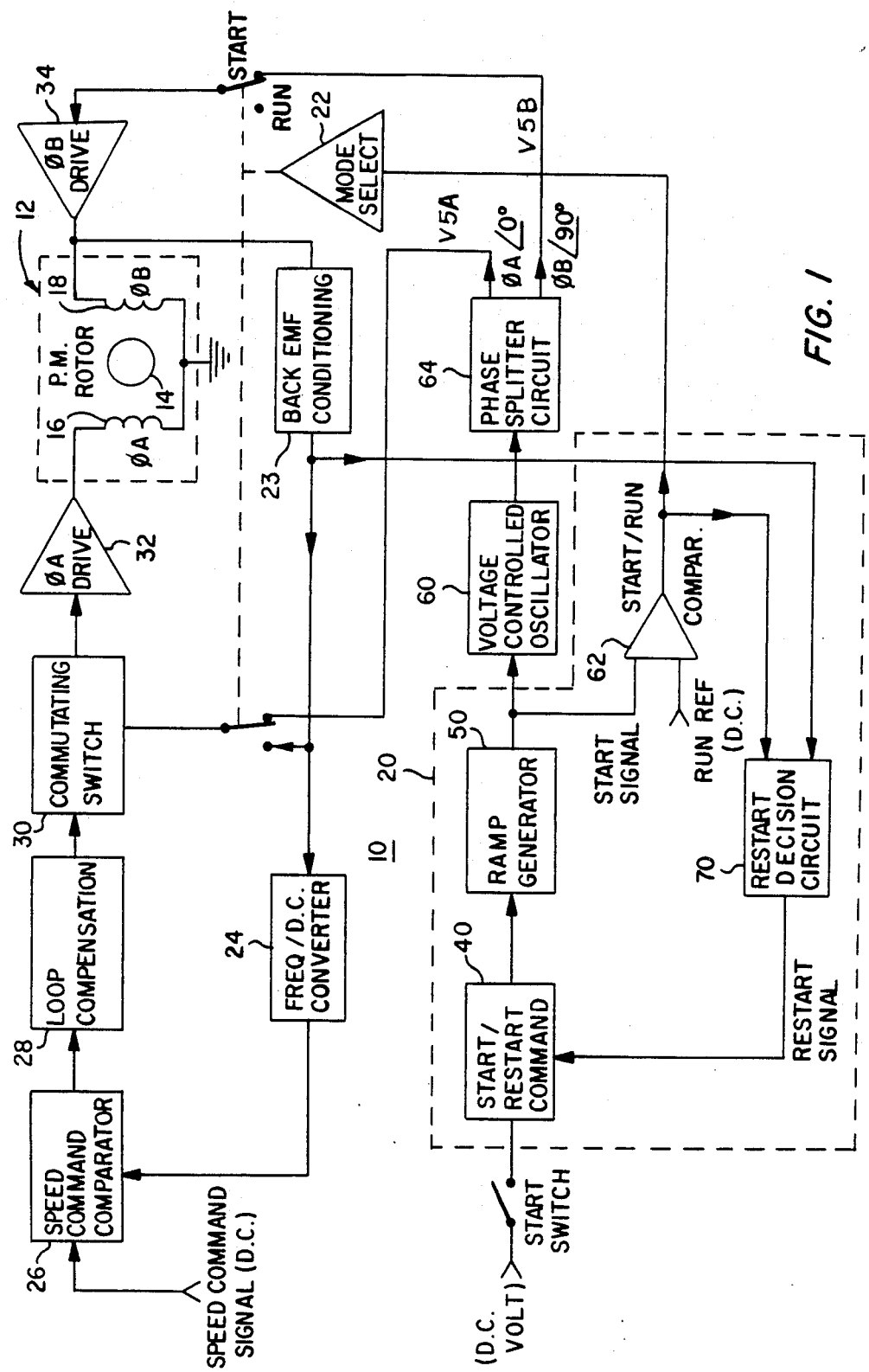
FIG. 1 is a block diagram of a control and drive circuit for a permanent magnet motor according to the present invention.

Referring now to the drawings and FIG. 1 in particular, there is shown a permanent magnet motor 12 drive, including a closed loop restarting circuit according to the present invention. Permanent magnet motor 12 includes a permanent magnet rotor 14 and a two-phase stator including a φ A winding 16 and a φ B winding 18. φ A winding 16 is utilized for driving the permanent magnet rotor. Winding 18 for φ B is energized for two-phase operation during start-up but thereafter is utilized as a sensing winding having a back EMF which is indicative of position and speed of rotor 14. A start decision circuit 20 is provided which controls starting and restarting of permanent magnet motor 12. An output of circuit 20 feeds a mode select switch 22 which provides for either a starting mode or a running mode for permanent magnet motor 12.

During start-up, permanent magnet motor 12 is operated in the two-phase mode with both windings 16 and 18 being driven. After the initial start-up, the permanent magnet motor is operated in the single phase mode when mode select switch 22 switches to run. At this time, winding 18, has a back EMF induced therein which is sensed by back EMF conditioning circuit 23. The output of back EMF conditioning circuit 23 is fed to the start circuit 20 and to a frequency-to-DC converter 24. The feedback signal from frequency-to-DC converter 24 is combined with the speed command signal in a speed command circuit 26. The output of speed command circuit 26 is fed to a loop compensation circuit 28 and therefrom to a commutating switch 30. Commutating switch 30 also has an input from the back EMF conditioning circuit 23 when permanent magnet motor 12 is in a single phase run mode. This input from the back EMF conditioning circuit 23 is used to impart appropriate frequency and time characteristics to commutating switch 30. The output of commutating switch 30 is applied to $\phi$ A driver 32 which provides drive power input to winding 16.

At start-up, a DC voltage is applied to the start/restart command circuit 40, within start circuit 20, which in turn provides a constant DC signal input to the ramp generating circuit 50. The ramp generating circuit 50 produces a decreasing ramp voltage which is supplied to a voltage controlled oscillator 60 and a start/run comparator 62. The start/run comparator 62 controls mode select switch 22 which selects a single or two-phase drive mode. An output of comparator 62 is also fed to restart decision circuit 70. The voltage controlled oscillator 60 generates an output signal, in response to the decreasing ramp input, which starts at DC and increases to a frequency approximately 10% of the synchronous frequency for permanent magnet motor 12.

During start-up the start/run comparator 62 selects the two-phase drive mode and keeps the restart decision circuit in an off state. The increasing frequency generated by the ramping function input to the voltage controlled oscillator 60 is divided into two outputs 90° out of phase by a phase splitter circuit 64. The inphase output of splitter circuit 64 operates the commutating switch 30, which provides an output through drive amplifier 32 to drive winding 16. The quadrature output of splitter circuit 64 is fed to a power amplifying stage 34. The output of amplifier 34 drives winding 18 during two-phase operation.

Permanent magnet motor 12 is driven in a two-phase mode until the ramping voltage applied to voltage oscillator 60 drops below a preset level. When the ramping voltage output from ramping generator 50 falls below the preset level, single phase drive mode operation is initiated and the back EMF signal induced in winding 18 is processed by the back EMF conditioning circuit 23. The output of the back EMF conditioning circuit is sampled by the restart decision circuit 70. The restart decision circuit 70 determines if a run or a restart mode is to be commanded. Once a run mode is entered, the back EMF conditioning circuit processes the voltage induced in the sensing winding 18 and generates the required timing to the commutating switch 30 which is needed to obtain maximum efficiency. This back EMF voltage induced in winding 18 and processed by the back EMF conditioning circuit 23 provides wheel speed information to the restart decision circuit. After a predetermined sampling period the back EMF feedback voltage is tested and if its level is below a preset value, the restart decision circuit commands a restart. This sequence is repeated as necessary. The restart decision circuit 70 remains active even during steady state single phase operation of permanent magnet motor 12, allowing wheel speed to be continuously monitored. In case of an unexpected wheel run down, the restart mode is again initiated.

Figure 2:
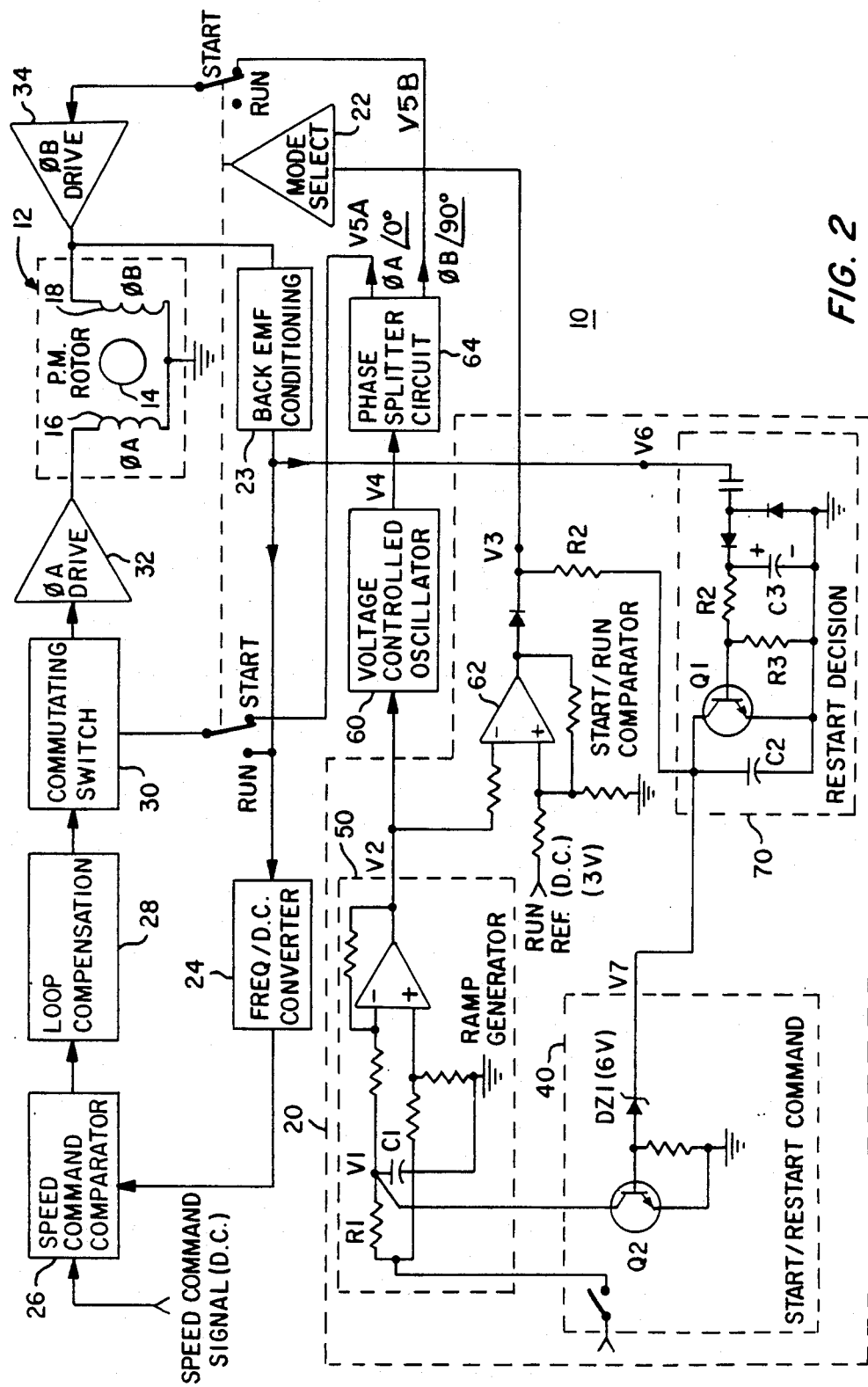
FIG. 2 is a diagram similar to FIG. 1 with the start decision circuit shown in more detail.
Figure 3:
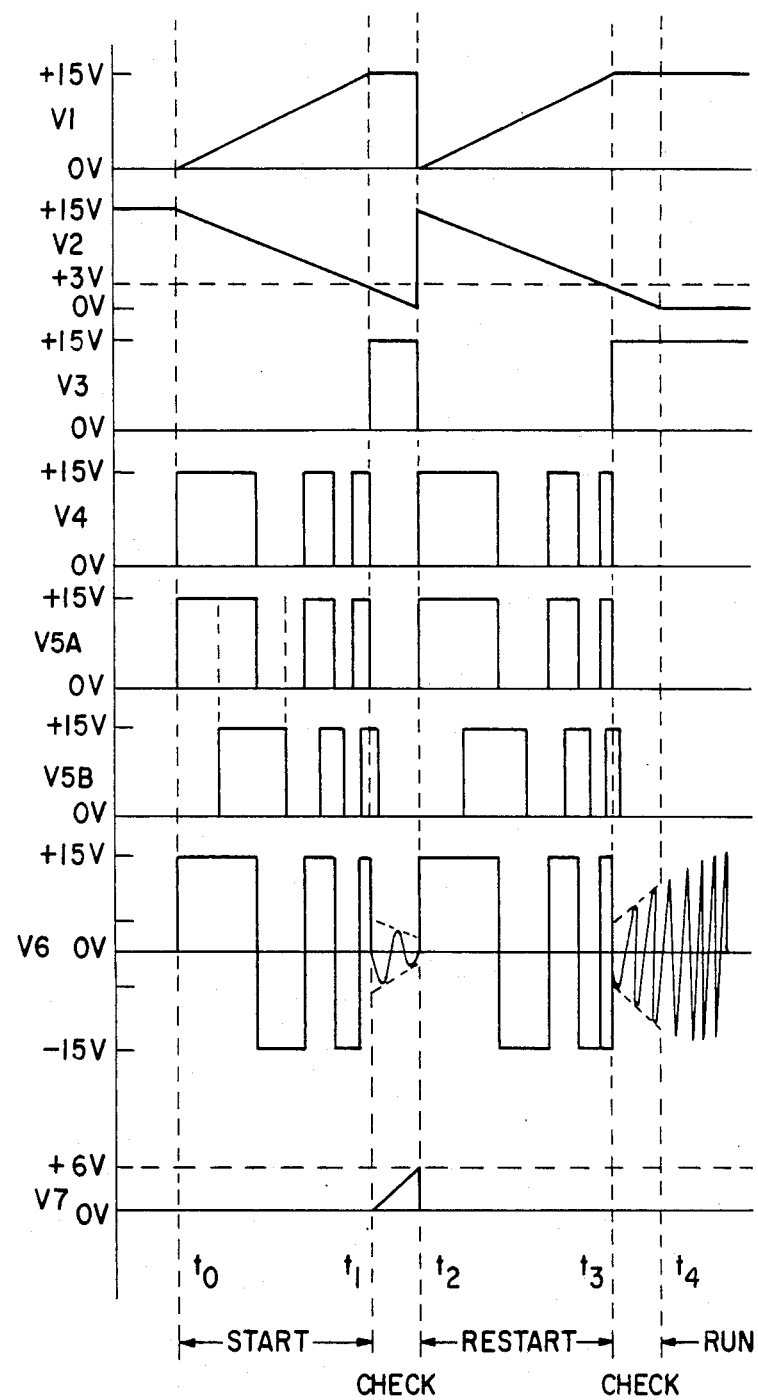
FIG. 3 is a diagram showing voltage waveforms at various points in the circuit of FIG. 2 during a possible start cycle.

FIG. 3 shows the voltage waveforms present in circuit 10, at various points shown in FIG. 2, during a start/restart cycle. During start a DC voltage is applied to the ramp generator circuit 50. DC voltage through resistor R1 charges a capacitor C1. Voltage V1 across capacitor C1 is shown in FIG. 3. The output of ramp generator circuit 50 is a decreasing ramp voltage V2. Decreasing ramp voltage V2 is applied as an input to start/run comparator 62. The other input to start/run comparator 62 is a three volt DC reference voltage. When voltage V2 drops below the three volt reference, mode select switch 22 switches to a run mode.

During the start mode, the output, V2, of ramp generator circuit 50, is fed to voltage controlled oscillator 60. Voltage controlled oscillator 60 provides an output voltage V4 which is initially a zero frequency DC voltage which is changed to an increasing frequency output to drive permanent magnet motor 12 up to a suitable speed, which is typically 5% to 10% of synchronous speed. The output V4 of voltage controlled oscillator 60 is fed to the phase splitter circuit 64 which provides two outputs, V5A, V5B, which are 90° out of phase. The output V5A is fed to the commutating switch 30 and is used for toggling the speed loop command signal outputted by the loop compensation circuit 28. The output of the commutating switch 30 feeds the $\phi$A drive 32 which provides the drive current to the $\phi$A winding 16. The V5B output feeds the $\phi$B driver 34 directly which provides the drive current to the $\phi$B winding 18. When voltage V2 falls below the three volt reference, the start/run comparator 62 changes state commanding the mode select switch 22 to change to the run mode. At this time winding 18 is no longer driven but acts as a sensing winding.

The back EMF induced in winding 18 is fed to back EMF conditioning circuit 23. The output V6 of back EMF conditioning circuit 23 is fed to restart decision circuit 70. During the time periods as shown in FIG. 3 between $t_1$ and $t_2$, the conditioned back EMF, V6, is sampled. V6 is converted to a DC voltage across capacitors C3, which is proportional to wheel speed, in the restart decision circuit 70. If the voltage across capacitor C3 is below a preset value, determined by resistors R2 and R3, transistor Q1 is not turned on. The voltage, V7, across capacitor C2 therefore increases as shown in FIG. 3 until the breakdown voltage of zener diode DZ1 is exceeded, at which point transistor Q2 is turned on and capacitor C1, in the ramp generating circuit 50, is discharged.

The turning on of transistor Q2 causes voltage V1 to drop to zero and the start cycle is again initiated. Voltage V2 is reset as shown at time $t_2$ and then decreases until it falls below the run reference three volt signal applied to comparator 62 at which time the mode select switch 22 is again switched to the run mode. If the output of the back EMF conditioning circuit 23 is large enough, the DC voltage across C3 will exceed the preset value and transistor Q1 will be turned on keeping capacitor C2 from charging and holding voltage V7 near zero preventing the start cycle from again being initiated. If during operation the output of the back EMF conditioning circuit 23 allows voltage V6 to decrease so that transistor Q1 is turned off, then capacitor C2 will charge increasing voltage V7 applied to zener diode DZ1. When the voltage V7 applied to DZ1 exceeds the breakdown level, transistor Q2 will be turned on again actuating the start cycle.

What is claimed:

1. A permanent magnet motor drive system comprising:

a permanent magnet rotor;

a two-phase stator having a first winding and a second winding;

power means providing electrical power for driving the first winding and the second winding in a two-phase drive mode during a start cycle;

means for initiating single phase driving after a selected period of time for driving only the first winding;

test means including means for sampling the back EMF signal induced in the second winding during single phase driving and means for initiating a two-phase drive restart cycle if the sampled back EMF falls below a predetermined value.

2. A permanent magnet motor drive system as claimed in claim 1 further comprising:

a commutating switch responsive to an input control signal for controlling when drive current is supplied to the first winding; and a mode select switch operable when single phase driving is initiated for interrupting drive current to the second winding and for connecting to said commutating switch, the input control signal derived from the back EMF induced in the second winding, which is a function of rotor speed.

3. A permanent magnet motor drive system as claimed in claim 2 further comprising:

a start control circuit providing an output for controlling operation of said mode select switch and also providing an increasing frequency signal during the start cycle; and a phase splitter circuit, receiving the increasing frequency signal from saic start control circuit, having a first output which is utilized to drive the second winding during said start cycle and a second output, phase shifted with respect to the first output, which is utilized for the input to the commutating switch during said start cycle.

4. A starting system for a motor having a permanent magnet rotor and a plurality of stator windings, the starting system comprises:

means for polyphase driving the stator windings during a starting cycle;

single phase drive means for single phase driving the permanent magnet rotor after the starting cycle;

test means including means for sampling the back EMF induced in one of the stator windings after the starting cycle and means for reinitiating polyphase driving of the stator windings if the sampled back EMF is below a selected value.

5. A method for operating a motor having a permanent magnet rotor and a plurality of stator windings comprising the steps of:

(a) providing drive signals to the plurality of stator windings during a start cycle;

(b) switching to a single phase drive mode, driving one of the stator windings, after a period of time;

(c) sampling the back EMF induced in one of the unenergized stator windings during the single phase drive mode; and (d) reinitiating step (a) if the sampled back EMF is below a selected reference value.

6. A closed loop drive system (10) for a permanent magnet motor (12) operable in a two phase drive mode during a start cycle and a single phase drive mode during a run cycle, following the start cycle, characterized by:

a restart decision circuit (20) which monitors the back EMF induced in an unenergized stator winding (13) during the run cycle and reinitiates the two-phase drive mode if the induced back EMF falls below a selected reference value.

7. A closed loop drive system (10) as claimed in claim 6 further comprising:

a commutating switch (30) responsive to an input control signal for controlling when drive current is supplied to a first stator winding (16); and a mode select switch (22) operable between a start condition, supplying a signal which is utilized for driving a second stator winding (18) during the start cycle, and a run condition, connecting to said commutating switch (30) an input control signal derived from back EMF induced in the second stator winding (18) during the run cycle.

8. A closed loop drive system (10) as claimed in claim 7 further comprising:

frequency control means (50, 60) for providing an increasing frequency signal during the start cycle; and a phase shifter circuit (64) connected to receive the increasing frequency signal from the frequency control means (50, 60) and providing a first output which is utilized to drive the second winding (18) during a start cycle and a second output, phase shifted with respect to the first output, which is utilized for the control input to the commutating switch (30) during the start cycle.

9. A closed loop drive system (10) as claimed in claim 8 further comprising:

a speed command signal;

a feedback signal, derived during the run cycle from the back EMF induced in the second winding (18); and comparator means (26) for comparing the speed command signal and the feedback signal and providing an error signal which is utilized through commutating switch (30) for driving the first stator winding (16) during the run cycle.

* * * * *